United States Patent [19]
Goodman

[11] Patent Number: 6,111,853
[45] Date of Patent: Aug. 29, 2000

[54] NETWORK PROTECTION SCHEME

[75] Inventor: David Michael Goodman, St Albans, United Kingdom

[73] Assignee: Nortel Networks Corporation, Montreal, Canada

[21] Appl. No.: 08/883,185

[22] Filed: Jun. 26, 1997

[51] Int. Cl.[7] .............................. G01R 13/08; H04B 3/38; H04Q 5/00

[52] U.S. Cl. ........................... 370/224; 340/827; 340/825

[58] Field of Search ................................... 370/222, 224; 340/827, 825.01, 825.05

[56] References Cited

U.S. PATENT DOCUMENTS

| | | | |
|---|---|---|---|
| 5,159,595 | 10/1992 | Flanagan et al. | |
| 5,307,353 | 4/1994 | Yamashita et al. | 370/224 |
| 5,442,620 | 8/1995 | Kremer | 370/224 |
| 5,495,472 | 2/1996 | Ohara | 370/224 |
| 5,680,235 | 10/1997 | Johansson . | |

FOREIGN PATENT DOCUMENTS 0519712  6/1992  European Pat. Off. .
96/32787  10/1998  WIPO .

*Primary Examiner*—Hassan Kizou
*Assistant Examiner*—Hanh Nguyen
*Attorney, Agent, or Firm*—Lee, Mann, Smith, McWilliams, Sweeney & Ohlson

[57] ABSTRACT

A communication arrangement for use in a communication network and comprises a number of pieces of communication equipment or nodes arranged in a ring configuration of first and second ring paths operated in respective first and second opposite directions so as to provide path protection within the ring. A selected piece of equipment provides a head end for the ring. The ring is configured via said switching circuits provided in the pieces of equipment so as to provide a virtual break in a ring section adjacent the head end piece of equipment. In response to detection of a fault in a ring section the switching circuits to reconfigure the ring so as to move the virtual break from the ring section adjacent the head end piece of equipment to the ring section in which the fault has been detected so as to maintain path protection by forming two loops extending from the virtual break in the ring configuration in opposite directions to the head end.

6 Claims, 2 Drawing Sheets

NETWORK PROTECTION SCHEME

The present invention relates to a method and apparatus for protecting communication networks.

It is common for communications equipment to be connected together in a configuration commonly known as a ring. In this type of configuration, it is necessary to provide some protection for messages being passed between pieces of equipment so as to prevent the whole ring failing in the event that either one of the pieces of communication equipment fails or else a link between two pieces of communication equipment fails. A particular problem arises in situations where a number of pieces of communication equipment wish to receive signals from a single head end site. The site may commonly house an operator's local switch, ATM edge switch, a video server or some other transmission equipment.

Currently, there are two basic types of protection which are being used. In the first type of protection, all the pieces of communication equipment (nodes) are connected to the head end by two communication paths for circulating information in opposite directions and information is passed from the head end to the nodes down both parts simultaneously. Communication equipment at each node is then free to choose the information from one of the two paths. While such an arrangement is secure, it does not provide any return bandwidth in the event that the head end is broadcasting traffic. Also, there is no re-configuration of any part of the ring in the event of a fault.

The second protection scheme will be described in relation to FIG. 1 which explains a scheme described in CA-A-2,081,051. In this figure, the ring head end 10 normally communicates with remote communication equipment 11, 12 and 13 using a communication ring 14. A protection ring 15 indicated in broken lines is also provided but is not used in normal operation. In the event that a fault arises, the location of the fault is detected in some convenient manner and the communication ring is re-configured by causing nodes on either side of the fault to cause the ring 14 to be connected to the ring 15 as will be described in more detail.

Let us assume that there is a fault in the ring between the nodes 12 and 13 as indicated by the large X. Nodes 12 and 13 detect this and, in the case of the node 12 the input port for ring 14 is connected through the node 12 to the output port for the ring 15, thus bringing the portion of the ring 15 between the node 12 and the head end 10 into operation. Likewise, the node 13 causes the output port for the ring 14 to be connected to the input port for the ring 15 bringing into operation the portion of the ring 15 between the node 13 and the head end 10.

In the re-configured state, information destined for node 13 travels firstly by means of the ring 14 through nodes 1 1 and 12, by the ring 15 from node 12 through node 11, head end 10 and into node 13.

While this arrangement is an improvement on the previously proposed method, messages from the head end are sent only one way from the head end and thus the arrangement is still very inefficient because there is no return bandwidth available in the event that there is broadcast traffic from the head end 10.

It is an object of the present invention to provide a method of protecting communication networks in such a way that there is capacity for return traffic even in the event of failure of the network and in the presence of broadcast traffic.

SUMMARY OF THE INVENTION

The present invention provides a method of transmitting information between a number of pieces of communication equipment in a communications network, the pieces of communication equipment each having receive and transmit ports for inputting and outputting information to and from the network and being arranged in a ring circuit system form of first and second rings operated in opposite directions, the pieces of communications equipment dividing said ring circuit system into ring sections, wherein the method comprises the steps of i) detecting the occurrence of a fault in the ring circuit system;

ii) reconfiguring the ring circuit system to utilize a ring section normally not used to form two loops extending from the fault in the ring circuit system in opposite directions; and iii) connecting both loops to then receive and transmit parts of one of the pieces of communication equipment.

The present invention also provides communication equipment for use in a communications network including first and second rings adapted to operate to pass information in opposite directions, the equipment comprising first and second input ports for connection to the first and second rings respectively and first and second output ports for connection to the first and second rings respectively, a receive port for receiving information to be added to the network, a transmit port for transmitting information received from the network, a switching circuit for altering the connections between the ports, and control means response to detection of a fault in the network for controlling the switching circuit, to connect the first and second input ports to the transmit port and the first and second output ports to the receive port An advantage of the above method and apparatus is that when the head end is broadcasting traffic, even in the event of a fault, there is bandwidth available for return messages to the head end.

Figure 1:
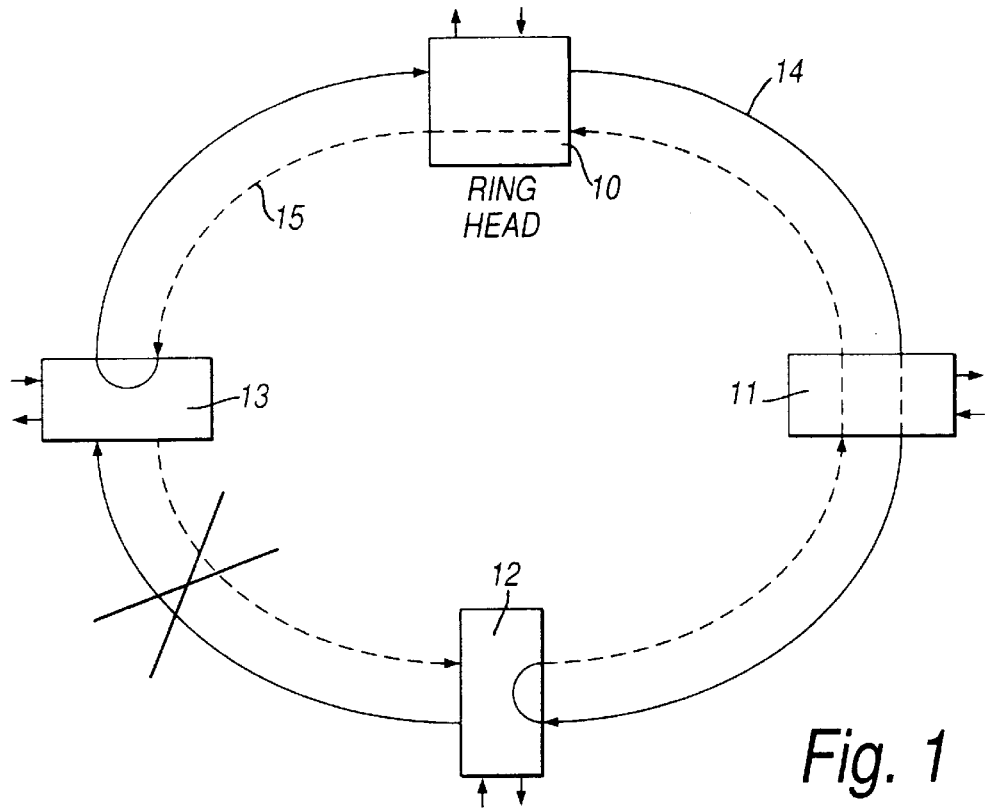
FIG. 1 shows a diagram depicting a prior art protection scheme.
Figure 2:
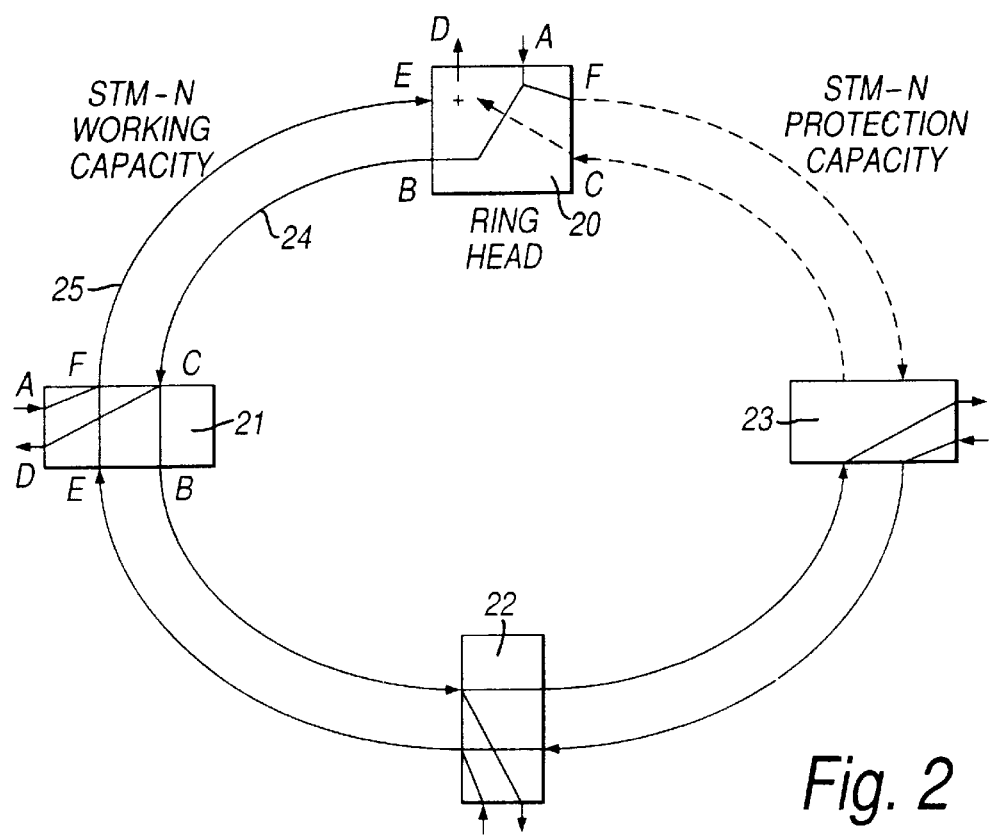
FIG. 2 shows a diagram representing a protection system according to the present invention.

In the preferred embodiment of the present invention, the network may be thought of as two concentric rings with traffic being capable of flowing in the rings in opposite directions. In normal operation as shown in FIG. 2, one ring 24 runs from a head end 20 to nodes 21, 22 and 23 and will carry traffic in a counterclockwise direction. The other ring 25 extends to the head end 20 from the nodes 23, 22 and 21 and is capable of carrying traffic in a clockwise direction. The portions of both rings 24,25 between the node 23 and the head end 20 are not normally used.

In the event of a fault, the ring is re-configured to form two loops, one on either side of the head end 20 and the head end is arranged to transmit into both loops and receive return information from both loops. The way in which this is achieved will now be described.

The head end and each node all have the same port configuration, which is as follows:

Port A is a receive port for receiving information to put into the network;

Port B is an output port connected to the ring 24;

Port C is an input port connected to the ring 24;

Port D is a transmit port for transmitting information from the network to another device or devices;

Port E is an input port connected to the ring 25; and

Port F is an output port connected to the ring 24.

In normal operation, each node 21, 22, 23 has its receive port A connected to the output port F and its transmit port D connected to the input port C. Each node except the last node in the ring 24 is capable of passing information not destined for itself from its input port C to its output port B and from its input port E to its output port F. The head end 20 is configured differently in normal operation in that its receive port A is connected to its output port B while its input port E is connected to its transmit port D.

Figure 4:
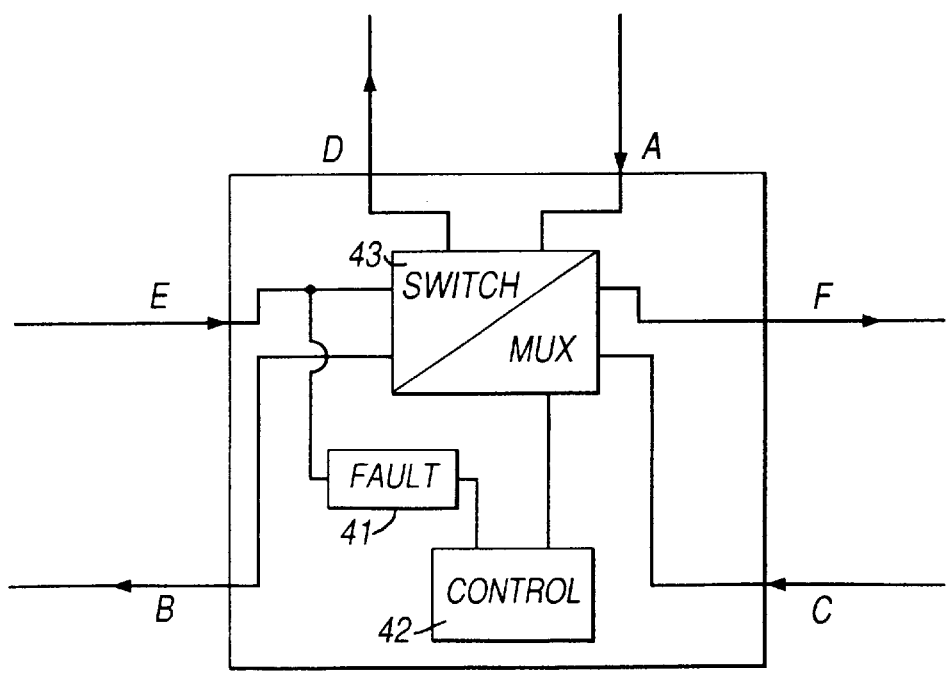
FIG. 4 shows a block diagram of a piece of communications equipment suitable for use in the system shown in FIG. 2.

Each piece of equipment also has the following circuitry as shown in FIG. 4, namely a fault detector circuit 41 which, when activated causes a control circuit 42 to carry out the appropriate port to port connections via a switch circuit 43. The fault detector circuit 41 may operate in a number of ways and be sensitive to the following: a loss of signal on an input port, loss of a part of a signal, and excessive amount of errors in data received, and the presence of a fault flag from an upstream node. The control circuitry detects the type of fault signal and, if appropriate causes the switching circuit to operate. It also inserts a fault flag into the control/data it adds to the ring so as to signal the fault to other nodes.

Figure 3:
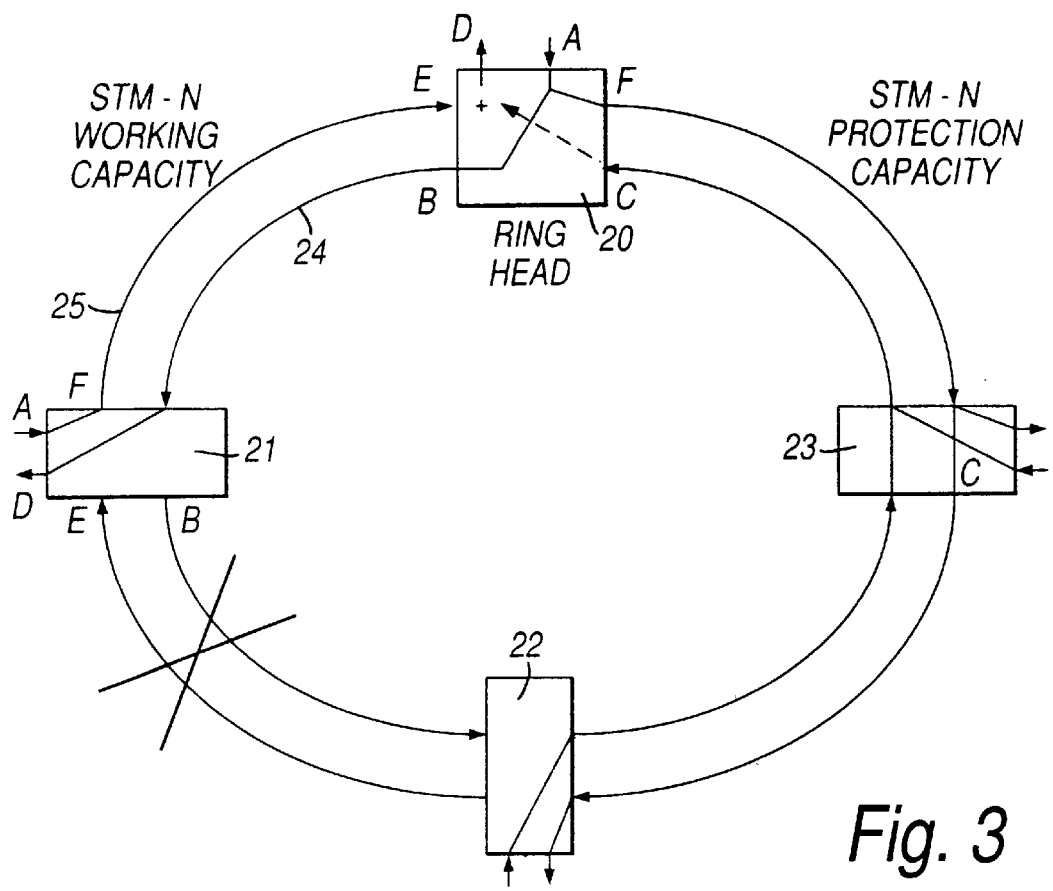
FIG. 3 shows a diagram similar to that shown in FIG. 2 but modified due to the presence of a fault.

In the presence of a fault, as shown in FIG. 3 the nodes on either side of the fault operate in similar but opposite manners in order to isolate the faulty section of the network. This is achieved by one of the nodes connecting the ring input D to the ring output B while the other nodes on the other side of the fault connects the ring input port C to the ring output port E. Neither node will pass information from its input to its output ports in either direction. This brings the previously unused parts of the rings 24 and 25 into operation and creates two loops one on either side of the head end. The head end itself also has to modify its connection scheme. In the presence of a fault, the receive port A remains connected to the ring output port B but also is connected to the ring output port E. This means that information destined for the network is transmitted to both of the loops which have been formed by the re-configuration of the ring. Likewise, the transmit port D is connected to the receive port C and the receive port D. This allows return information to be received from the ring and transmitted to other devices remote from the network.

It is to be noted that node 23 has also changed its connection configuration. In the presence of a fault, it now passes information not destined for itself from its input to its output ports and has its receive port A connected to its output port B while its transmit port D is connected to its receive port E.

For traffic added to the ring from nodes and destined for the head end, the working assumption is that before the occurrence of a fault, all traffic added must have been connected and administered to fit inside the return bandwidth of one chain or ring, also inside the transmit port bandwidth of the head end 20. After the occurrence of a fault, traffic added which is destined for the head end, has potentially more bandwidth available but provided it obeys the previous restriction it must still fit inside the head end transmit port bandwidth. Therefore, the head end only has to unintelligently sum the traffic added from both chains knowing that it "fitted" before the occurrence of the fault.

The way in which the head end combines traffic coming from both directions from two chains or loops formed as a result of re-configuration of the network upon the occurrence of a fault, although relatively simple, requires some explanation. The exact way in which the head end operates will depend on the type of traffic being handled by the network. One example is traffic of the virtual container level 4 (VC-4) type. It is assumed that when nodes "turn round" in response to a fault, that dropped and inserted time slots remain the same. In normal operation, the transmit port from the head end would select outgoing traffic only from the clockwise ring or loop 25. In the presence of a fault, the head end transmit port would be required to select some traffic from the clockwise ring or loop 25 and some traffic from the anti-clockwise ring 24. Numerous criteria are available for this selection including checking for correct path trace, having nodes which break through paths sets the paths unequipped, or having nodes which break through paths set them AIS. Node behaviour could be chosen such that the head end only requires a normal SNC/path protection selector.

The above scheme has been described in relation to synchronous traffic but it could be applied to AFM traffic which is s synchronous or to a mixture of synchronous and ATM traffic in which case then subsidiary nodes will be performing a cell drop and insert function. In this case the complexity of the addition option at the head end applies to this type of traffic depends on the nature of the service the ring offers. For instance, if the peak rates of node ingress traffic at the receive port A are all controlled to a total value less than the total available ring bandwidth, then after re-configuration of the ring, the sum of cell rates arriving at the additional section of the head end will not increase. They will also fit in the transmit port, so cells just have to be multiplexed into the transmit port. If, on the other hand, some measure of ATM switch functionality is incorporated in the drop and insert nodes, in order to permit ATM physical interface capable of burst operation or to support some network statistical gain, then the addition function will also require ATM switch functionality.

Not all networks need to have all nodes protected. One such example is where the VC-4 scheme has added to it an ATM or SDH service where the ATM cells and the SDH traffic can be contained with the VC-4 scheme. It is therefore desirable to select a protocol which permits leaving certain nodes unaffected and which could ease the upgrade of the other nodes. It is reasonable to assume that existing nodes which should be left unaffected can transparently pass VC-4 traffic. Therefore, the path overhead of the VC-4 traffic can be used to receive a protection protocol. The preferred protocol conforms with the following rules:

i) Nodes need to know which port is clockwise and which port is anticlockwise.

ii) If a span between nodes fails in one direction then it is assumed that the corresponding span in the opposite direction has also failed.

iii) Nodes which see a failure in one direction with respect to themselves take no action.

The above described arrangement offers efficiency advantages for broadcast traffic applications, in that bandwidth available for return traffic is not reduced by the broadcast. This advantage can be used with SDH, Sonet, ATM or mixed traffic types. The precise messaging protocol which will be necessary to initiate a fault or to control switching should be suited to or selected for the specific application.

What is claimed is:

1. A method of transmitting information between a number of pieces of communication equipment or nodes in a communication network, the pieces of communication equipment each having receive and transmit ports for inputting and outputting information to and from the network and being arranged in a ring configuration of first and second ring paths operated in respective first and second opposite directions so as to provide path protection of said information transmitted between said pieces of equipment, the pieces of equipment dividing said ring into ring sections, a selected said piece of equipment providing a head end for the ring, wherein the method comprises the steps of:

configuring the ring so as to provide first and second disjoint loops each extending around the ring in respective first and second directions and having a gap therebetween in a selected said ring section between two adjacent pieces of equipment;

detecting the occurrence of a fault in a said ring section; and reconfiguring the ring by reconfiguring said first and second loops so as to move said gap between said first and second loops from said selected ring section to coincide with the ring section in which the fault has been detected so as to maintain said path protection around said ring in opposite directions, said first and second loops being operatively connected to the receive and transmit ports of said head end piece of equipment.

2. A method according to claim 1, wherein the pieces of communication equipment have first and second output ports and first and second input ports for connection to the first and second rings respectively, the connecting step of connecting both loops to the transmit port including the step of multiplying the information from both loops on to the transmit port of said one of the pieces of communications equipment.

3. A method according to claim 1 wherein the pieces of communication equipment have first and second output ports and first and second input ports for connection to the first and second rings respectively, the connecting step of connecting both loops to the transmit port including the step of adding the information from one loop to the information from the other loop.

4. A method of transmitting information between a number of pieces of communication equipment or nodes in a communication network, the pieces of communication equipment each having receive and transmit ports for inputting and outputting information to and from the network and being arranged in a ring configuration of first and second ring paths operated in respective first and second opposite directions so as to provide path protection of said information transmitted between said pieces of equipment, the pieces of equipment dividing said ring into ring sections, a selected said piece of equipment providing a head end for the ring, wherein the method comprises the steps of:

configuring the ring so as to provide first and second disjoint loops each extending around the ring in respective first and second directions and having a gap therebetween in a said ring section adjacent said head end piece of equipment;

detecting the occurrence of a fault in a said ring section; and reconfiguring the ring by reconfiguring said first and second loops so as to move said gap between said first and second loops from said ring section adjacent the head end piece of equipment to coincide with the ring section in which the fault has been detected so as to maintain said path protection around said ring in opposite directions, said first and second loops being operatively connected to the receive and transmit ports of said head end piece of equipment.

5. A communication arrangement for use in a communication network and comprising a number of pieces of communication equipment or nodes arranged in a ring configuration of first and second ring paths operated in respective first and second opposite directions so as to provide path protection of said information transmitted between said pieces of equipment, each said piece of equipment having first and second input ports and first and second output ports for connection to said ring paths, a receive port for receiving information to be added to the network, and a transmit port for transmitting information from the network, and a switching circuit for altering connections between the ports, the pieces of communication equipment dividing said ring configuration into ring sections, wherein a selected said piece of equipment provides a head end for the ring, wherein said ring is configured via said switching circuits so as to provide first and second disjoint loops each extending around the ring in respective first and second directions and having a gap therebetween in a said ring section adjacent said head end piece of equipment, and wherein each said piece of equipment incorporates control means responsive to detection of a fault in a said ring section for controlling the switching circuits to reconfigure the ring by reconfiguring said first and second loops so as to move said gap between said first and second loops from said ring section adjacent the head end piece of equipment to coincide with the ring section in which the fault has been detected so as to maintain said path protection around said ring in opposite directions, said first and second loops being operatively connected to the receive and transmit ports of said head end piece of equipment.

6. An arrangement according to claim 5, and including in each said piece of communication equipment a multiplexing device for receiving information from the first and second input ports and for feeding multiplexed information to the transmit port.

* * * * *